UNITED STATES PATENT OFFICE.

A. M. BOUTON, OF NEWARK, NEW JERSEY.

IMPROVED COMPOSITION FOR REMOVING INK FROM TYPE.

Specification forming part of Letters Patent No. 58,370, dated October 2, 1866.

*To all whom it may concern:*

Be it known that I, A. M. BOUTON, of Newark, county of Essex, and State of New Jersey, have invented a new and useful Composition to Remove Printers' Ink from Forms and Rollers, which composition can be used to take off paint or any oily substance from clothing, of which the following is a specification.

The nature of my invention consists in combining bone-spirits, after being distilled in the ordinary way, with a certain portion of pearlash. If to be used for the cleansing of clothing, I use two pounds of pearlash to one pound of distilled bone-spirits; but if the compound is to be used for painters' or printers' use, I reverse the quantity, or put two pounds of distilled bone-spirits to one pound of pearlash. If I wish to make the compound strong, I use as little boiling-hot water as will dissolve the pearlash. I find this article of different strength when purchased from different manufacturers. After letting the dissolved pearlash cool, I add the distilled bone-spirits in quantities as above stated.

The pearlash can be dissolved in cold water; but it will take double the quantity, and require a vessel of glass twice as large to hold it, and cost double for transportation. The strength required for removing either paint or ink will depend upon the compound used to make the ink or paint; but it can be used with impunity without injury to the hands for a great variety of purposes.

To enable others skilled in the art of using caustic soda and caustic potash to remove ink from forms and rollers, or paint from boards or other substances, in a cheaper and easy manner, I will merely state I use this new compound as a substitute for anything previously known to either profession, according to my own knowledge and honest belief.

What I claim as my invention, and desire to secure by Letters Patent, is—

The use of these substances in any combination for cleansing purposes, substantially as set forth in the foregoing.

A. M. BOUTON.

Witnesses:
D. B. CROCKETT,
W. H. FRANCIS.